Figure 1:
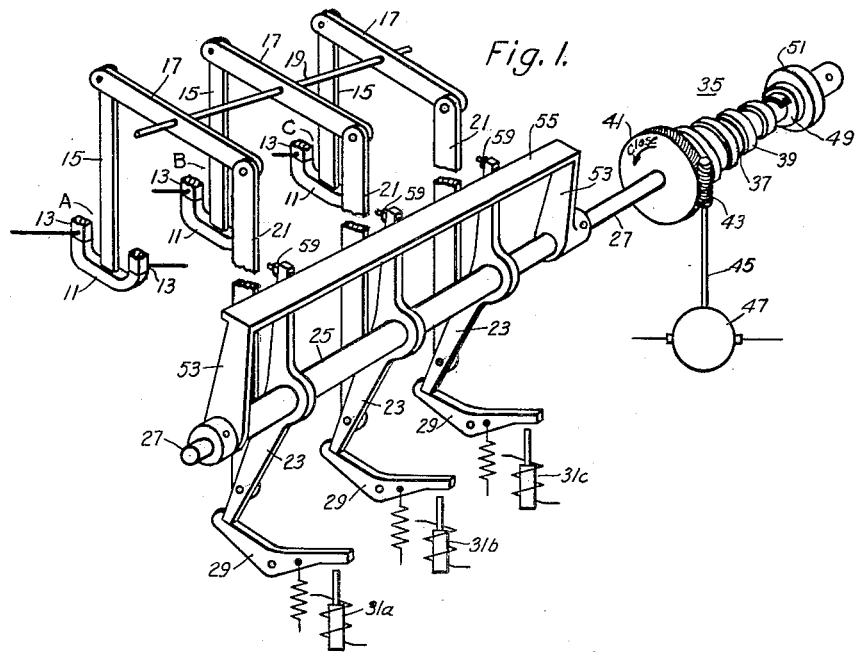

Nov. 19, 1946.  L. B. CHUBBUCK  2,411,366

CIRCUIT INTERRUPTER

Filed Jan. 14, 1944

WITNESSES:

INVENTOR
Leonard B. Chubbuck
BY
Ralph H. Swingle
ATTORNEY

Patented Nov. 19, 1946

2,411,366

UNITED STATES PATENT OFFICE 2,411,366

CIRCUIT INTERRUPTER

Leonard B. Chubbuck, Hamilton, Ontario, Canada, assignor to Westinghouse Electric Corporation, East Pittsburgh, Pa., a corporation of Pennsylvania Application January 14, 1944, Serial No. 518,207

11 Claims. (Cl. 175—294)

This invention relates to circuit interrupters and, more particularly, to operating means for operating one or more poles of a multipole circuit breaker.

Under certain conditions, it may be advantageous to control a polyphase electric power transmission system by selective operation of one or more of the single-phase circuit interrupters. This selective control known as single phase switching may be of particular value in maintaining service continuity in the case of a temporary single phase-to-ground fault or even a phase-to-phase fault. When a conventional multipole circuit interrupter, in which the several poles are arranged for unitary operation by a common operating mechanism, is used to control a polyphase circuit, all phases are simultaneously interrupted in response to a fault occurring in any one of the phase circuits, thus completely interrupting the service. It is possible, however, by the use of single-phase or selective-phase switching to interrupt only the particular phase or phases in which the fault occurs. The load may be partially carried on the remaining phases for a limited time, thus maintaining the supply of energy.

An object of the present invention is the provision of an improved multiphase circuit breaker system wherein the phase circuit breaker unit associated with a faulted phase is initially tripped open in response to a fault condition and automatically reclosed.

Another object of the invention is the provision of an improved multipole circuit breaker system having independently operable circuit breaker phase units which are individually tripped open initially in response to predetermined fault conditions on their associated phase conductors and a single closing means for automatically reclosing any circuit breaker phase units that have been tripped open.

Another object of the invention is the provision of a multiphase circuit breaker system as described in the preceding objects and wherein each circuit breaker unit is made trip-free of the single closing means in a very simple and inexpensive manner.

Another object of the invention is to provide a polyphase circuit interrupter having an improved operating mechanism wherein a trip-free means is provided for operatively relating the circuit breaker units to the common closing means so that each circuit breaker phase unit can trip free of the closing means if closed against a faulted line.

Another object of the invention is to provide an improved polyphase circuit interrupter with a closing means common to all of the phase circuit interrupters, power operated means for operating said closing means, and separate means operable in response to predetermined conditions in any phase of said circuit to effect disconnection of the power operated means from the closing means to provide trip-free operation.

Another object of the invention is to provide an improved polyphase circuit interrupter having a single-pole circuit interrupter in series with each phase circuit, the interrupters being arranged so that each interrupter is independently tripped open in response to abnormal conditions in the related phase circuit, a closing means for the interrupters, power operated means for actuating said closing means, and coupling means for releasably coupling the power operated means to the closing means, said coupling means being operable by means responsive to abnormal conditions in any one of said phase circuits to uncouple the closing means from the power operated means and permit opening by the interrupter for the affected phase circuit irrespective of the condition of the power operated means.

Figure 2:
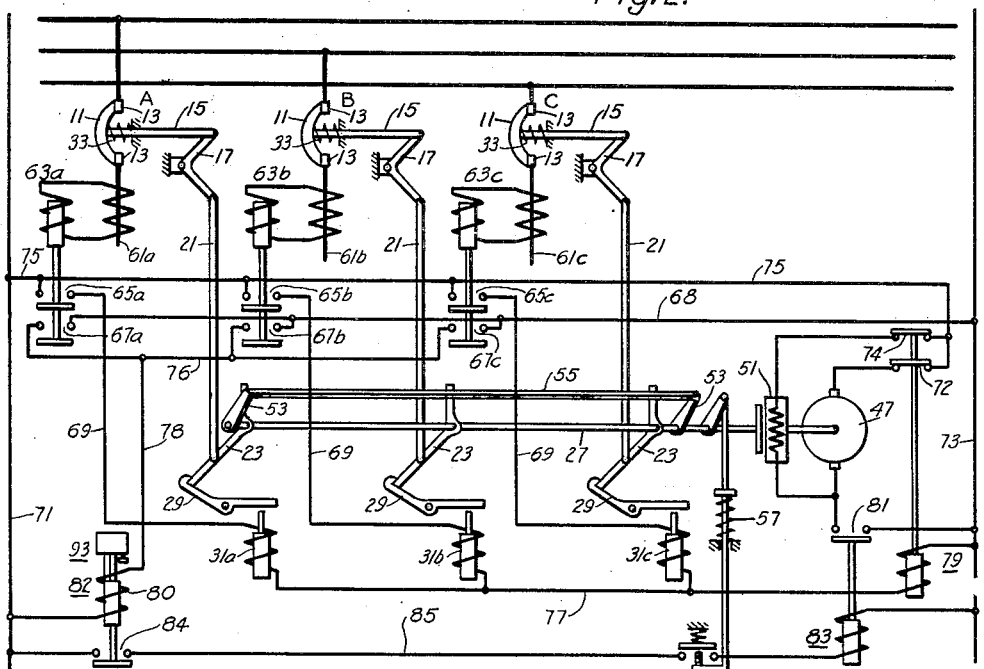

The novel features that are considered characteristic of the invention are set forth in particular in the appended claims. The invention itself, however, both as to structure and operation, together with additional objects and advantages thereof, will be best understood from the following description thereof when read in conjunction with the accompanying drawing, in which:

Figure 1 is a schematic view in perspective of the operating mechanism embodying the principles of the invention; and Fig. 2 is a diagrammatic view showing the multiphase circuit breaker system and operating means including one form of control circuit for controlling the operation of the mechanism shown in Fig. 1.

Referring to Fig. 1 of the drawing, the circuit interrupters designated A, B and C for the three phases of the polyphase circuit may be of any suitable type. The interrupters schematically shown each comprises a bridging contact member 11 cooperating with stationary contacts 13. Each of the bridging contacts 11 is mounted on a breaker rod 15, which is pivotally connected at its upper end to a lever 17. The levers 17 are each pivoted on a suitably supported shaft 19 and are pivotally connected at their other ends to vertically disposed links 21, the lower ends of which links are pivotally connected to independently releasable levers 23. Each of the levers 23 is freely rotatably mounted on a sleeve 25, surrounding a shaft 27, and is normally restrained in closed-circuit position by a pivoted latch lever 29 engaging the lower end of said lever 23. Independently energizable tripping electromagnets 31a, 31b and 31c are provided for operating the corresponding latches 29. Each tripping electromagnet is operable upon the occurrence of a fault in the corresponding phase circuit to actuate the corresponding latch 29 and permit movement of the bridging contact 11 for that phase to open position. Each phase circuit interrupter is provided with an accelerating spring 33 (Fig. 2) which acts upon release of the corresponding lever 23 to move the interrupter mechanism for that phase to the open position.

A single operating mechanism common to all of the circuit breaker units is provided for closing the circuit breakers and for automatically reclosing any circuit breaker units that have been tripped open. The operating mechanism for the circuit interrupters is generally indicated at 35. The operating mechanism may be of any suitable type, preferably of the motor and clutch type fully disclosed in Patent No. 2,021,499, granted to L. B. Chubbuck et al. November 19, 1935, and assigned to the assignee of the present invention. The operating mechanism is provided with a clutch of the friction-band type. The clutch comprises a drum 37 mounted for rotation with the shaft 27. Surrounding the drum 37 is a helical clutch band 39 having one end secured to a worm wheel 41 mounted for rotation relative to the drum 37. A worm 43 is mounted on a motor shaft 45 and meshes with the worm wheel 41. A motor 47 is provided to drive the shaft 45. There is normally a slight clearance between the clutch band 39 and the drum 37 to permit the drum and the shaft 27 to rotate independently of the clutch band. A clutch plate 49 is secured to the other end of the clutch band 39 and is mounted loosely on the shaft and for rotation about the shaft 27. Mounted on the shaft 27 for rotation therewith is an electromagnetic clutch 51 having an energizing winding (not shown) thereon. Also mounted on the shaft 27 for rotation therewith is a pair of arms 53 rigidly connected at their free ends by an integral yoke 55. A relatively light spring 57 (Fig. 2) is provided to hold the yoke 55 in contact with adjusting screws 59 carried in the upper ends of the levers 23.

Referring now to the circuit diagram (Fig. 2), the phase circuit interrupters A, B and C control corresponding phase load conductors 61a, 61b and 61c from a three-phase supply circuit. The phase load lines are provided respectively with protective relays schematically shown at 63a, 63b and 63c, each of which is adapted to be operated in response to a predetermined fault condition such as an overload or short circuit on the associated phase load conductor. These relays are provided with normally open contacts 65a, 65b and 65c and also with normally open contacts 67a, 67b and 67c, respectively. The contacts 65a, 65b and 65c are connected by conductors 69 in series relation with the tripping electromagnets 31a, 31b and 31c, respectively, and the contacts 65 and tripping electromagnets 31 for the several phases are connected in parallel across a control circuit comprising supply conductors 71 and 73. The contacts 65a, 65b and 65c are connected to the supply conductor 71 by means of a conductor 75, and the tripping electromagnets 31a, 31b and 31c are connected by a common conductor 77 through the winding of a trip-free relay 79 to the supply conductor 73. The contacts 67a, 67b and 67c are connected to the supply conductor 73 by a common conductor 68. The other side of the contacts 67a, 67b and 67c are connected by means of a common conductor 76 and a conductor 78 to the coil 80 of a time element reclosing relay 82, the other side of the coil 80 being connected to the conductor 71. The relay 82 is for the purpose of energizing a motor contactor 83 at a predetermined time during the opening stroke of any one of the circuit interrupters and for maintaining the motor contactor energized a sufficient length of time to normally effect complete closing of the circuit interrupter. The motor 47 and the coil of the clutch electromagnet 51 are connected to the supply conductor 71 through back contacts 72 and 74, respectively, of the trip-free relay 79 and the conductor 75. The motor 47 and the clutch electromagnet 51 are both connected to the supply conductor 73 through the normally open contacts 81 of the motor contactor relay 83. The winding of the relay 83 is connected to the supply circuit 71—73 by a conductor 85 through normally open contacts 84 of the relay 80 and normally open auxiliary switch contacts 87.

The auxiliary switch contacts 87 are operated in accordance with the position of the member 55 and are arranged to close during the initial opening movement of any of the circuit interrupters to prepare a circuit for energizing the motor contactor relay 83. The contacts 87 open near the end of the closing stroke to deenergize the other motor contactor which opens at contacts 81 to deenergize the motor 47 and the electromagnetic clutch 51.

The operation of the circuit breaker system is as follows: Assuming that the system is in normal operating condition and that the interrupters are all closed; upon the occurrence of a phase-to-ground fault in phase A for example, the protective relay 63a will be operated, closing the contacts 65a and contacts 67a. Closure of contacts 65a energizes the tripping electromagnet 31a from the conductor 71 over a part of the conductor 75, contacts 65a, conductor 69, coil of the phase A tripping electromagnet 31a, conductor 77 and the winding of the trip-free relay 79 to the conductor 73. Energization of the relay 79 opens the contacts 72 and 74, thus preventing immediate energization of the motor 47 and clutch 51. When the tripping electromagnet 31a is energized, it operates the latch lever 29 to release the lever 23 and permits the accelerating spring 33 to move the phase A circuit interrupter to the open circuit position, the phase B and C interrupters remaining in the closed position. Movement of the phase A circuit interrupter to the open position rotates the releasable lever 23 in a clockwise direction. Due to the engagement of the lever 23 with the yoke 55, the clockwise movement of the lever 23 rotates the yoke 55, shaft 27, clutch drum 37 and the clutch member 51 therewith. The coil of the trip-free relay 79 was energized simultaneously with the tripping electromagnet, but both the tripping electromagnet and the relay 79 are deenergized as soon as the interrupter contacts 11—13 have separated far enough to extinguish the arc, thus reclosing the contacts 72 and 74. Early in the opening stroke of the mechanism, the auxiliary switch contacts 87 close to prepare a circuit for energizing the motor contactor relay 83. This circuit extends from the conductor 71 through the contacts 84 of the relay 80, the conductor 85, auxiliary contacts 87 and winding of the motor contactor relay 83 to the conductor 73.

This circuit for the coil of the motor contactor 83 is closed at a predetermined point in the opening movement of the circuit interrupter phase unit by a closing of contacts 84 of the time element reclosing relay 82 which picks up a short time after closing of the protective relay contacts 67. The time of pick up of the relay 82 may be adjusted or set at any desired value so as to energize the motor contactor 83 at any desired predetermined point in the opening stroke of the circuit interrupter unit or units. The relay 82 is also provided with an adjustable means shown schematically at 93 for maintaining its contacts 84 closed for a predetermined time interval sufficient to normally maintain the motor contactor 83 energized long enough to ensure completion of the closing operation of the circuit interrupter, after which the relay drops out.

Energization of the relay 83 closes the contacts 81 and simultaneously energize the motor 47 and the electromagnetic clutch 51. Energization of the clutch 51 causes it to attract the clutch plate 49 and thus hold the adjacent end of the clutch band 39. The motor, which is now running, rotates the worm wheel 41 in a counterclockwise or closing direction, tightening the clutch band about the drum 37. Continued rotation of the worm wheel 41 picks up the drum 37 and rotates the drum, the shaft 27 and the yoke 55 in closing direction. During this movement the yoke 55 rotates the lever 23 to reclose the contacts of the affected phase interrupter, which, in this example, is phase unit A. Near the end of the closing stroke, the tail of the lever 23 is relatched by the latch lever 29, and at approximately the same time the auxiliary switch contacts 87 open, dropping out the motor contactor relay 83 and opening the contacts 81. This deenergizes the clutch electromagnet 51 and the motor 47 with the interrupter in the closed position.

Each phase circuit interrupter is tripped open and reclosed in the same manner in response to a fault condition on the corresponding phase of the load circuit.

The interrupters for each phase of the circuit are each independently trip-free of the operating mechanism. That is to say, if the interrupter for any one of the phases A, B or C is closed or reclosed against a fault, the interrupter for that phase will be immediately tripped open irrespective of the energized condition of the motor and independently of the interrupters for the other two phases. This is effected by deenergizing the clutch electromagnet when the interrupter is closed in against a fault. As previously stated, the energizing circuit for the clutch electromagnet extends serially through the contacts 74. These contacts, as well as the contacts 72, are opened upon the occurrence of a fault in any of the phase load circuits in response to energization of any of the protective relays, but close as soon as the contacts 11—13 have separated far enough to open the circuit of the corresponding phase. If, for example, the contacts 11—13 of phase B are closed against a fault, the protective relay 63b will operate and close the contacts 65b to energize the trip coil 31b and the coil of relay 79. Energization of the relay 79 opens the contacts 72 and 74 thus deenergizing the clutch 51 and the motor. The shaft 27 and the yoke 55 are thus disconnected from the motor, and the accelerating spring immediately moves the affected phase circuit interrupter to the open position. If the fault has cleared upon reclosing of any of the interrupters that has tripped open, the interrupter remains in the latched closed position.

Suitable means (not shown) may be provided for tripping out all of the circuit interrupters if any one of the interrupters is closed in against a faulted line. This means is not shown herein but may be of the type disclosed in application Serial No. 415,605, filed October 18, 1941, by Willard A. Derr, now Patent No. 2,374,001, issued April 17, 1945, and assigned to the assignee of the instant application.

By the provision of a trip-free connection between the power operated means and the closing means only a single trip-free means is required for all three of the circuit interrupters.

Having described the invention in accordance with the patent statutes, it is to be understood that various changes and modifications may be made in the structural details disclosed without departing from some of the essential features of the invention. It is, therefore, desired that the language of the appended claims be given as reasonably broad interpretation as the prior art permits.

I claim as my invention:

1. A polyphase circuit interrupter comprising a phase circuit interrupter for each phase of the circuit, means for effecting independent opening of each phase circuit interrupter in response to abnormal conditions in the associated phase circuit, operating mechanism comprising a member common to all of said phase interrupters and operable to close any of said phase circuit interrupters that are open, power operated means for actuating said member, coupling means between said member and said power operated means for connecting and disconnecting said member to said power operated means, and means operated upon opening of any one of said phase interrupters to cause said coupling means to couple the power operated means to said member and to cause energization of said power operated means.

2. A polyphase circuit interrupter comprising a set of separable contacts connected in series relation in each phase circuit, means for independently opening each set of contacts in response to abnormal conditions in the related phase circuit, actuating means common to all of said sets of contacts and operable to close any and all sets of contacts that are open, power operated means for operating the actuating means, coupling means between the power operated means and said actuating means for connecting and disconnecting the actuating means to said power operated means, and means operable upon opening of any one of said sets of contacts to effect operation of said coupling means and energization of said power operated means.

3. A polyphase circuit interrupter comprising a single-pole circuit interrupter in series with each of a plurality of phase circuits, tripping means for each phase circuit interrupter operable in response to abnormal conditions in the related phase circuit to cause opening of the corresponding circuit interrupter, an actuator common to all of said interrupters and operable to close said interrupters, power operated means for operating said actuator to close any circuit interrupter that is open, means for releasably coupling the power operated means to said actuator, and means operable in response to predetermined abnormal conditions in any one of said phase circuits to cause the coupling means to release the actuator from the power operated means and thereby cause opening of the interrupter in the affected phase irrespective of the condition of the power operated means.

4. In combination, a polyphase circuit, a single-pole circuit interrupter in series with each phase circuit, a trip device for each circuit interrupter operable in response to predetermined abnormal conditions occurring in the related phase circuit to cause opening of the associated circuit interrupter, a common actuator for closing said interrupters, power operated means for operating said actuator, coupling means for releasably coupling said power operated means to said actuator, means for causing operation of said power operated means and said coupling means to effect closing of the circuit interrupters, and means responsive to abnormal condition in any one of the phase circuits to cause said coupling means to release the actuator from the power operated means to cause opening of the interrupter in the affected phase circuit irrespective of the condition of said power operated means.

5. A polyphase circuit interrupter comprising a single-pole circuit interrupter in series with each phase circuit, a releasable member for each interrupter operable when released to effect opening of the associated interrupter, means for releasably restraining said releasable members in operative position, a plurality of trip devices each responsive to abnormal conditions in the associated phase circuit to effect release of the related releasable member and opening of the related interrupter, an actuator common to all of said releasable members for operating said releasable members to close the interrupters, power operated means for operating said actuator, coupling means for releasably coupling said power operated means to said actuator, means for causing operation of said coupling means and said power operated means to close said interrupters, and means operable in response to abnormal conditions in any one of said phase circuits to cause the coupling means to release the actuator from said power operated means and thereby cause opening of the interrupter in the affected phase circuit irrespective of the condition of the power operated means.

6. In a polyphase circuit interrupter comprising a single-pole circuit interrupter in series with each phase circuit, means for opening each interrupter in response to predetermined conditions in the associated phase of the circuit, operating means for closing said interrupters comprising a member common to all of said interrupters and operable to close said interrupters, power operated means for operating said member, coupling means for releasably coupling said power operated means to said member, means operable in response to opening of any one of said interrupters to cause operation of said power operated means to reclose said interrupter, and means responsive to predetermined conditions in the associated phase circuit to cause said coupling means to release said member from said power operated means and effect opening of the associated interrupter irrespective of the condition of the power operated means.

7. In a polyphase circuit interrupter comprising a single-pole circuit interrupter in series with each phase circuit, means for opening each interrupter in response to predetermined conditions in the associated phase of the circuit, operating mechanism for said interrupters comprising a releasable member for each interrupter operable when released to permit opening of the associated interrupter, closing means cooperating with all of said releasable members for moving said members to close the interrupters, power operated means for operating said closing means, releasable coupling means for coupling said power operated means to said closing means, and means operable upon opening of any one of said interrupters to cause operation of the coupling means and the power operated means to close the interrupter for the affected phase circuit.

8. In a polyphase circuit interrupter comprising a single-pole interrupter in series with each phase circuit, a releasable member for each interrupter for restraining the associated interrupter in closed position and operable upon release to effect opening of said interrupter, latch means for restraining said releasable members in operative position, separate trip means for each interrupter operable in response to predetermined conditions in the associated phase of the circuit for operating the corresponding latch means, closing means cooperating with all of said releasable members and operable to close said interrupters, power operated means for operating said closing means, clutch means for releasably connecting said power operated means to the closing means, means operable in response to opening of any one of said interrupters to cause operation of said clutch and said power operated means to close said interrupters, and separate means for each phase circuit operable in response to predetermined conditions in the associated phase circuit to cause the clutch to release the closing means from said power operated means and thereby cause opening of the interrupter for the affected phase circuit irrespective of the condition of the power operated means.

9. A polyphase circuit breaker system comprising a plurality of independently operable circuit breaker units one for each phase of the circuit, separate means for each circuit breaker unit operable to cause opening of said circuit breaker unit in response to predetermined abnormal conditions in the corresponding phase of the circuit, a single operating mechanism common to all of said circuit breaker units comprising a closing member movable to close any and all circuit breaker units that are open, motive means for operating said closing member, means for releasably connecting said closing member to said motive means for operation thereby, and means operable in response to predetermined abnormal conditions in any phase of said circuit for causing said connecting means to release said closing member from said motive means.

10. In a polyphase circuit interrupter comprising a single-pole circuit interrupter for each phase circuit, means for opening each interrupter in response to predetermined conditions in the associated phase of the circuit, operating means for closing said interrupters comprising a member common to all of said interrupters and operable to close said interrupters, power operated means for operating said members, a trip-free connection between said power operated means and said member, means operable upon opening of any one of said interrupters to cause operation of said power operated means to close said interrupters, and means responsive to predetermined conditions in any phase of said circuit to cause said trip-free connection to permit opening of the associated interrupter irrespective of the condition of the power operated means.

11. In a polyphase circuit interrupter comprising a single-pole circuit interrupter for each phase circuit, means for opening each interrupter in response to predetermined conditions in the associated phase of the circuit, operating mechanism for said interrupters comprising a releasable member for each interrupter operable when released to permit opening of the associated interrupter, closing means cooperating with all of said releasable members for moving said members to close the interrupters, power operated means for operating said closing means, releasable coupling means for coupling said power operated means to said closing means, means operable upon opening of any one of said interrupters to cause operation of the coupling means and the power operated means to close the interrupter for the affected phase circuit, and means responsive to predetermined conditions in any one of the phase circuits to cause said coupling means to release said member from said power operated means and effect opening of the associated interrupter irrespective of the condition of the power operated means.

LEONARD B. CHUBBUCK.